United States Patent
Choudhari et al.

(10) Patent No.: US 10,235,160 B2
(45) Date of Patent: **\*Mar. 19, 2019**

(54) CONTROLLED DEPLOYMENT OF APPLICATION FEATURE

(71) Applicant: MICROSOFT TECHNOLOGY LICENSING, LLC, Redmond, WA (US)

(72) Inventors: Ankit Choudhari, Bothell, WA (US); Qi Jiang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/728,668

(22) Filed: Oct. 10, 2017

(65) Prior Publication Data

US 2018/0032325 A1  Feb. 1, 2018

Related U.S. Application Data

(63) Continuation of application No. 14/983,598, filed on Dec. 30, 2015, now Pat. No. 9,823,919.

(51) Int. Cl.
    *G06F 9/445* (2018.01)
    *G06F 8/65* (2018.01)

(52) U.S. Cl.
    CPC ............ *G06F 8/65* (2013.01); *G06F 9/44505* (2013.01)

(58) Field of Classification Search
    CPC ........................................................ G06F 8/65
    USPC .................................. 717/172–176; 709/203
    See application file for complete search history.

(56) References Cited

U.S. PATENT DOCUMENTS

| | | |
|---|---|---|
| 5,956,505 A | 9/1999 | Manduley |
| 8,122,055 B2 | 2/2012 | Grewal et al. |
| 8,239,509 B2 * | 8/2012 | Ferris ............... G06F 15/177 709/223 |
| 8,271,536 B2 | 9/2012 | Amradkar et al. |
| 8,280,945 B2 | 10/2012 | Putzolu |
| 8,464,241 B2 | 6/2013 | Hayton |

(Continued)

FOREIGN PATENT DOCUMENTS

WO  2010025110 A1  3/2010

OTHER PUBLICATIONS

Yokoyama et al, "Cluster as a Service for self-deployable cloud applications", IEEE, ,pp. 703-704, 2012 (Year: 2012).*
Demchenko et al, Enabling Automated Network Services Provisioning for Cloud Based Applications Using Zero Touch Provisioning, IEEE, pp. 458-464, 2015 (Year: 2015).*
Chauvel et al, "Robustness Indicators for Cloud-based Systems Topologies", IEEE, pp. 307-316, 2014 (Year: 2014).*

(Continued)

*Primary Examiner* — Anil Khatri
(74) *Attorney, Agent, or Firm* — Michael Best & Friedrich LLP (57) ABSTRACT

Controlled deployment of an application feature is provided. A deployment service initiates operations to control deployment of the application feature by receiving a definition of a feature of a mobile application and a group of tenants of the mobile application from a developer. The definition is used to allow the mobile application associated with the group of tenants to activate the feature. Next, a tenant identification is received from the mobile application. The tenant identification is compared to the group of tenants to detect the tenant identification as within the group of tenants. In response, an instruction is transmitted to the mobile application associated with the tenant identification to activate the feature.

20 Claims, 7 Drawing Sheets

(56) References Cited

U.S. PATENT DOCUMENTS

| | | | |
|---|---|---|---|
| 8,473,943 B2 | 6/2013 | Dujmovic | |
| 8,566,648 B2 | 10/2013 | Schroeder | |
| 8,620,897 B2 | 12/2013 | Solheim et al. | |
| 8,627,310 B2* | 1/2014 | Ashok | G06F 9/45558 717/174 |
| 8,631,099 B2* | 1/2014 | Morgan | G06F 9/5088 709/203 |
| 8,631,333 B2 | 1/2014 | Cahill et al. | |
| 8,726,264 B1 | 5/2014 | Allen et al. | |
| 8,745,223 B2 | 6/2014 | Hodul | |
| 8,762,505 B2 | 6/2014 | Kutan et al. | |
| 8,775,599 B2* | 7/2014 | Bansal | G06F 9/5072 709/223 |
| 8,813,076 B2* | 8/2014 | Anderson | G06F 9/45533 711/203 |
| 8,849,971 B2* | 9/2014 | Ferris | G06F 9/5077 709/203 |
| 8,856,382 B2* | 10/2014 | Akolkar | G06F 9/5072 709/203 |
| 8,875,120 B2* | 10/2014 | Venkatesan | G06F 8/65 717/172 |
| 8,881,136 B2* | 11/2014 | DeJana | G06F 8/65 709/201 |
| 8,887,144 B1 | 11/2014 | Marr et al. | |
| 8,904,511 B1 | 12/2014 | O'Neill et al. | |
| 8,914,789 B2* | 12/2014 | Barros | G06F 9/5088 717/103 |
| 8,984,503 B2* | 3/2015 | Poddar | G06F 17/30247 717/173 |
| 8,997,038 B2 | 3/2015 | Bozek et al. | |
| 9,009,697 B2* | 4/2015 | Breiter | G06F 9/5072 717/120 |
| 9,032,062 B2 | 5/2015 | Momchilov | |
| 9,081,601 B2 | 7/2015 | Tang | |
| 9,104,514 B2 | 8/2015 | Bravery et al. | |
| 9,185,342 B2 | 11/2015 | Isaacs | |
| 9,253,170 B2 | 2/2016 | Linga et al. | |
| 9,256,412 B2 | 2/2016 | Genevski et al. | |
| 9,354,485 B2* | 5/2016 | Fermann | G02F 1/39 |
| 9,372,733 B2 | 6/2016 | Copsey | |
| 9,442,778 B2 | 9/2016 | Desai et al. | |
| 9,569,193 B2* | 2/2017 | Pallamreddy | G06F 8/65 |
| 9,626,675 B2 | 4/2017 | Desai et al. | |
| 10,001,983 B2* | 6/2018 | Roy | G06F 8/65 |
| 2008/0244184 A1 | 10/2008 | Lewis et al. | |
| 2008/0270987 A1 | 10/2008 | Weissman | |
| 2010/0023937 A1 | 1/2010 | Kothari et al. | |
| 2010/0077449 A1 | 3/2010 | Kwok et al. | |
| 2012/0144454 A1 | 6/2012 | Lee | |
| 2012/0323643 A1 | 12/2012 | Volz | |

OTHER PUBLICATIONS

Xu et al, "Availability Analysis for Deployment of In-Cloud Applications", ACM, pp. 12-16, 2013 (Year: 2013).*

Caglar et al, "Model-driven Performance Estimation, Deployment, and Resource Management for Cloud-hosted Services", ACM, pp. 21-26, 2013 (Year: 2013).*

Wang et al, "Cloud-based Social Application Deployment using Local Processing and Global Distribution", ACM, pp. 301-312, 2012 (Year: 2012).*

"International Preliminary Report on Patentability Issued in PCT Application No. PCT/US2016/066745", Dated: Feb. 9, 2018, 9 Pages.

Bernini et al "A Software Architecture for the Deployment of Executable Transformation Models", ACM, pp. 47-51, 2009.

Lovstad et al, "Run-Time Software Configuration for Mobile Devices Using an Evolutionary Quantifiable Deployment Model", ACM, pp. 189-200, 2008.

Mietzner et al, "Variability Modeling to Support Customization and Deployment of Multi-Tenant-Aware Software as a Service Applications", IEEE, pp. 18-25, 2009.

Deters, "Developing and Deploying a Multi Agent System", ACM, pp. 175-176, 2000.

Moens et al, "Feature-Based Application Development and Management of Multi-Tenant Applications in Clouds", ACM, pp. 72-81, 2014.

Walraven, et al., "Efficient customization of multi-tenant Software-as-a-Service applications with service lines", In Journal of Systems & Software, vol. 91, Jan. 22, 2014, pp. 48-62.

Wang, et al., "Software Architecture Driven Configurability of Multi-tenant Saas Application", In Proceedings of Information Systems and Mining, Springer Berlin Heidelberg, Oct. 23, 2010, pp. 418-424.

"International Search Report and Written Opinion Issued in PCT Application No. PCT/US2016/066745", Dated: Mar. 24, 2017, 13 Pages.

Jun et al, "Automated Routing Protocol Selection in Mobile Ad Hoc Networks", ACM, pp. 906-913, 2007.

Bulut et al, "WiFi Access Point Deployment for Efficient Mobile Data Offloading", ACM, pp. 45-50, 2012.

Azeez, et al., "Multi-tenant SOA Middleware for Cloud Computing", In Proceedings of IEEE 3rd International Conference on Cloud Computing, Jul. 5, 2010, pp. 458-465.

"Non-Final Office Action Issued in U.S. Appl. No. 14/983,598", Dated: Mar. 13, 2017, 19 Pages.

"Notice of Allowance Issued in U.S. Appl. No. 14/983,598", Dated: Jul. 21, 2017, 12 Pages.

"Second Written Opinion Issued in PCT Application No. PCT/US2016/066745", Dated: Nov. 13, 2017, 8 Pages.

* cited by examiner

CONTROLLED DEPLOYMENT OF APPLICATION FEATURE

This application is a continuation under 35 U.S.C. § 120 of co-pending U.S. patent application Ser. No. 14/983,598 filed on Dec. 30, 2015. The disclosure of the U.S. Patent Application is hereby incorporated by reference in its entirety.

BACKGROUND

People interact with computer applications through user interfaces. While audio, tactile, and similar forms of user interfaces are available, visual user interfaces through a display device are the most common form of a user interface. With the development of faster and smaller electronics for computing devices, smaller size devices such as hand-held computers, smart phones, tablet devices, and comparable devices have become common. Such devices execute a wide variety of applications ranging from communication applications to complicated analysis tools. Many such applications are updated frequently with features that are rarely tested.

Vast number of feature requests and feature deployments complicate stable application deployment. Indeed, updates, changes, and/or additions to applications cause difficulties in upkeep by developers. While maintaining an application, an additional layer of complication faced by a developer includes feature requests associated by consumers of the application. Complications with multiple feature requests and vast number of applications may lead to mismanagement of issues that arises with introduction of new features.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to controlled deployment of an application feature. In some examples, a deployment service may receive a definition of a feature of a mobile application and a group of tenants of a mobile application from a developer. The deployment service may also receive a tenant identification from the mobile application. Next, the tenant identification may be detected within the group of tenants. In response, an instruction may be transmitted to the mobile application associated with the tenant identification to activate the feature.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, a deployment service provides controlled deployment of an application feature. In an example scenario, the deployment service may receive a definition of a feature of a mobile application and a group of tenants of the mobile application from a developer. The definition may be used to allow the mobile application associated with the group of tenants to activate the feature. The feature may include an existing component, a new component and/of a feedback component, among other components of the mobile application. Next, a tenant identification may be received from the mobile application. The tenant identification may include a unique identifier associated with a tenant accessing the mobile application The tenant identification may be compared to the group of tenants to detect the tenant identification as within the group of tenants. The group of tenants may include a subset of a tenant base classified to test the feature, and/or use the feature, among others. Next, an instruction may be transmitted to the mobile application associated with the tenant identification to activate the feature.

In the following detailed description, references are made to the accompanying drawings that form a part hereof and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a physical computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components to provide controlled deployment of an application feature. Examples of platforms include, but am not limited to, a hosted service executed over a plurality of servers, an application executed on a single computing device, and comparable systems. The term "server" generally refers to a computing device executing one or more software programs typically in a networked environment. More detail on these technologies and example operations is provided below.

A computing device, as used herein, refers to a device comprising at least a memory and a processor that includes a desktop computer, a laptop computer, a tablet computer, a smart phone, a vehicle mount computer, or a wearable computer. A memory may be a removable or non-removable component of a computing device configured to store one or more instructions to be executed by one or more processors. A processor may be a component of a computing device coupled to a memory and configured to execute programs in conjunction with instructions stored by the memory. A file is any form of structured data that is associated with audio, video, or similar content. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience—a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input. An application programming interface (API) may be a set of routines, protocols, and fools for an application or service that enable the application or service to interact or communicate with one or more other applications and services managed by separate entities.

Figure 1:
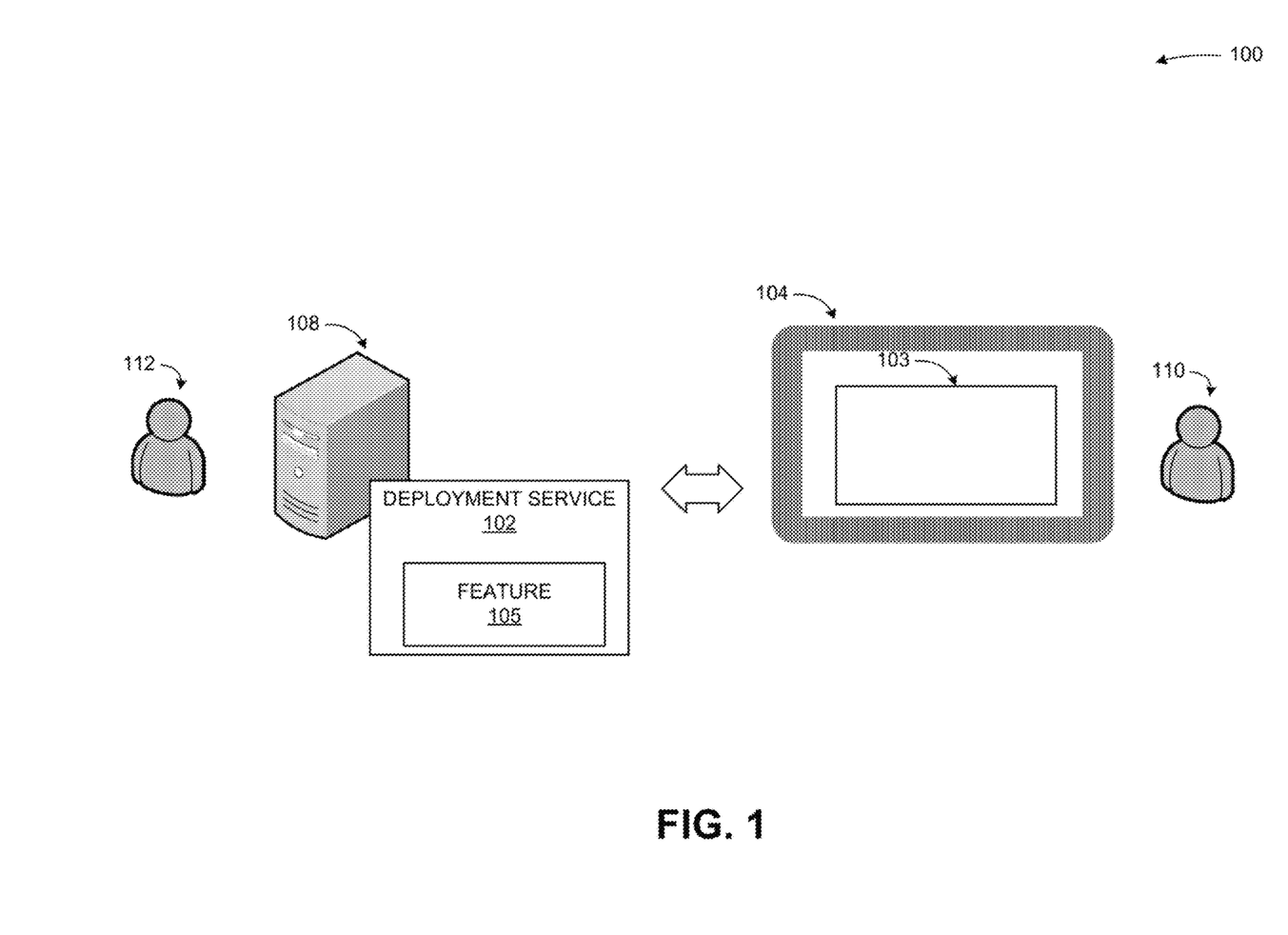
FIG. 1 is a conceptual diagram illustrating an example of providing controlled deployment of an application feature, according to embodiments.

FIG. 1 is a conceptual diagram illustrating an example of providing controlled deployment of an application feature, according to embodiments.

In a diagram 100, a server 108 may execute a deployment service 102. The server 108 may include a physical server providing one or more services to client devices. A service may include an application performing operations in relation to a client application and/or a subscriber, among others. The server 108 may include and/or is part of a workstation, a data warehouse, and/or a data center, among others.

The server 108 may execute the deployment service 102 to manage features provided by a mobile application 103. Release of a feature 105 may be controlled to test the feature 105 prior to deployment to an entirety of a tenant base of a mobile application 103. The mobile application 103 may be rendered by a client device 104 to a tenant 110. A developer 112 may provide a definition to the deployment service 102 to create a group of tenants and the feature 105 to activate at the mobile application 103. The deployment service 102 may relate the feature 105 with the group of the tenants.

Next, the deployment service 102 may compare a tenant identification of a tenant 110 against the group of tenants to detect the tenant identification within the group of tenants. In response to detecting the tenant identification within the group of tenants, the deployment service 102 may transmit an instruction to the mobile application 103 to activate the feature 105 for consumption by the tenant 110.

The server 108 may communicate with the client device 104 through a network. The network may provide wired or wireless communications between nodes such as the client device 104, or the server 108, among others. Previous example(s) to control features at the mobile application 103 is not provided in a limiting sense. Alternatively, the deployment service 102 may control deployment of the feature 105 at a desktop application, a workstation application, and/or a server application, among others. The mobile application 103 may also include a client interface of the deployment service 102.

The tenant 110 may interact with the mobile application 103 with a keyboard based input, a mouse based input, a voice based input, a pen based input, and a gesture based input, among others. The gesture based input may include one or more touch based actions such as a touch action, a swipe action, and a combination of each, among others.

While the example system in FIG. 1 has been described with specific components including the server 108, the deployment service 102, embodiments are not limited to these components or system configurations and can be implemented with other system configuration employing fewer or additional components.

Figure 2:
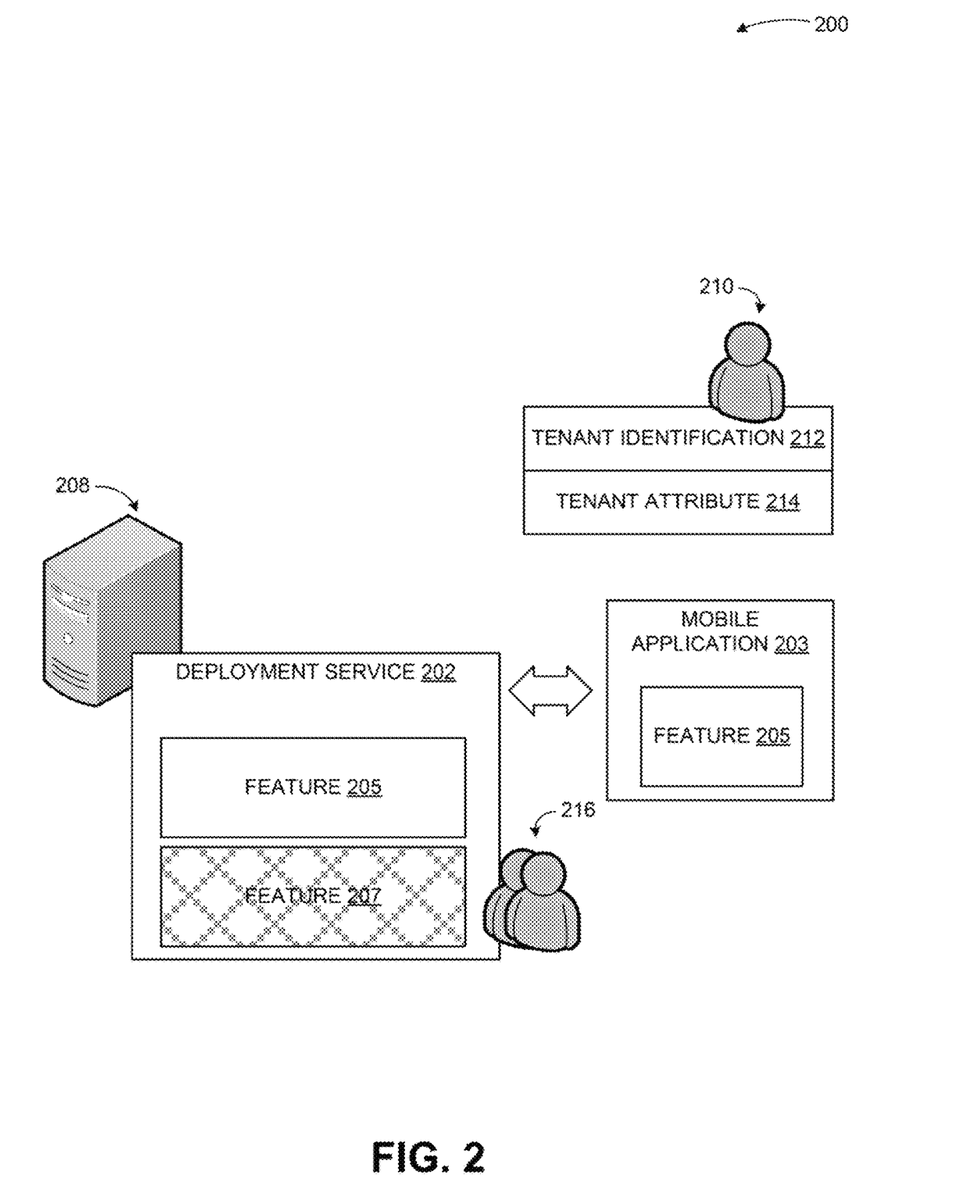
FIG. 2 is a display diagram illustrating an example of a scheme to provide controlled deployment of an application feature, according to embodiments.

FIG. 2 is a display diagram illustrating an example of a scheme to provide controlled deployment of an application feature, according to embodiments.

In a diagram 200, a server 208 may provide a deployment service 202 to allow a developer to control deployment of features (205, 207) to a mobile application 203. The features (205, 207) may include components of the mobile application 203 such as a user experience module and/or a feedback module, among others. The mobile application 203 may be installed with the features (205, 207) at a client device and which may be activated and/or deactivated.

Alternatively, the features (205, 207) may be installed through an update operation subsequent to an initial installation of the mobile application 203 at the client device. The features (205, 207) installed through the update operation may be activated and/or deactivated. Activation of the features (205, 207) may include rendering user interface(s) associated with the features (205, 207) or enabling operations associated with the features (205, 207) at the mobile application 203. Deactivation, of the features (205, 207) may include hiding user interfaces associated with the features (205, 207) or disabling operations associated with the features (205, 207) at the mobile application 203.

For example, the deployment service 202 may receive a definition of a group of tenants 216 and a feature 205 to activate at the mobile application 203 from a developer. The deployment service 202 may also receive a tenant identification 212 from the mobile application 203, in response to an initiation (or an execution) of the mobile application 203 at the client device. Next, the tenant identification 212 may be compared to the group of tenants 216. In response to detecting the tenant identification 212 within the group of tenants 216, an instruction may be transmitted to the mobile application 203 to activate the feature 205.

The developer may choose to stagger deployment of the feature 205 to thoroughly test the feature 205 prior to deployment to entirety of a tenant base of the mobile application 203. The test group such as the group of tenants 216 may be selected by the developer to try out the features (205, 207). The mobile application 203 may also be instructed to provide feedback feature(s) to allow the test group to evaluate the feature 205. Feedback may allow the developer to identify faults and/or bugs in the feature 205 and fix any issues with the feature prior to deployment to the tenant base of the mobile application.

Alternatively, the deployment service 202 may receive a definition from the developer to deploy the feature 205 to a percentage of the group of tenants 216. After receiving a request to activate the feature 205 in a mobile application 203 from the developer, the deployment service 202 may wait to receive a tenant identification 212 of a tenant 210 from the mobile application 203. The mobile application 203 may transmit the tenant identification 212 at an initiation of the mobile application 203 in a client device in response to an input by the tenant 210. The tenant identification 212 may include a unique identifier assigned to the tenant 210 such as a credential.

The group of tenants may be analyzed to determine an availability of an allocation within the percentage of the group of tenants 216. If the availability of the allocation is detected, the deployment service 202 may transmit an instruction to the mobile application 203 to activate the feature 205. If an unavailability of the allocation is detected, the deployment service 202 may transmit an instruction to the mobile application 203 to not activate the feature.

Alternatively, the deployment service 202 may receive an instruction to deactivate a feature 207 deployed to the mobile application 203 from the developer. The deployment service 202 may wait to receive the tenant identification 212 in response to an initiation of the mobile application 203 at the client device to transmit an instruction to deactivate a feature 207. Alternatively, the deployment service 202 may transmit an instruction to deactivate the feature 207 to the mobile application 203 and other mobile applications identified to have an activated version of the feature 207.

In another example scenario, a tenant attribute 214 may be identified by the deployment service 202 to classify the tenant 210 as within the group of tenants 216. For example, a tenant location as the tenant attribute 214 may be compared to a geographic location (such as a city, a country, a continent, and/or a marketing zone, among others). The tenant identification 212 may be identified as within the group of tenants 216 in response to detecting the tenant location as encompassed within the geographical location of the group of tenants 216 may determine. Alternatively, the tenant location outside the geographical location of the group of tenants 216 may be used to deactivate the feature 207 deployed to the mobile application 203 associated with the tenant 210.

Similarly, a tenant role may also be used as the tenant attribute 214 to compare against the group attribute associated with the group of tenants 216. An example of tenant role may include a tester, a supervisor, and/or a power user, among others. A match may be used to classify the tenant identification 212 as within the group of tenants 216. A failure to match may be used to transmit an instruction to deactivate a deployed feature such as the feature 207 to the mobile application 203 associated with a tenant who has the tenant role.

Figure 3:
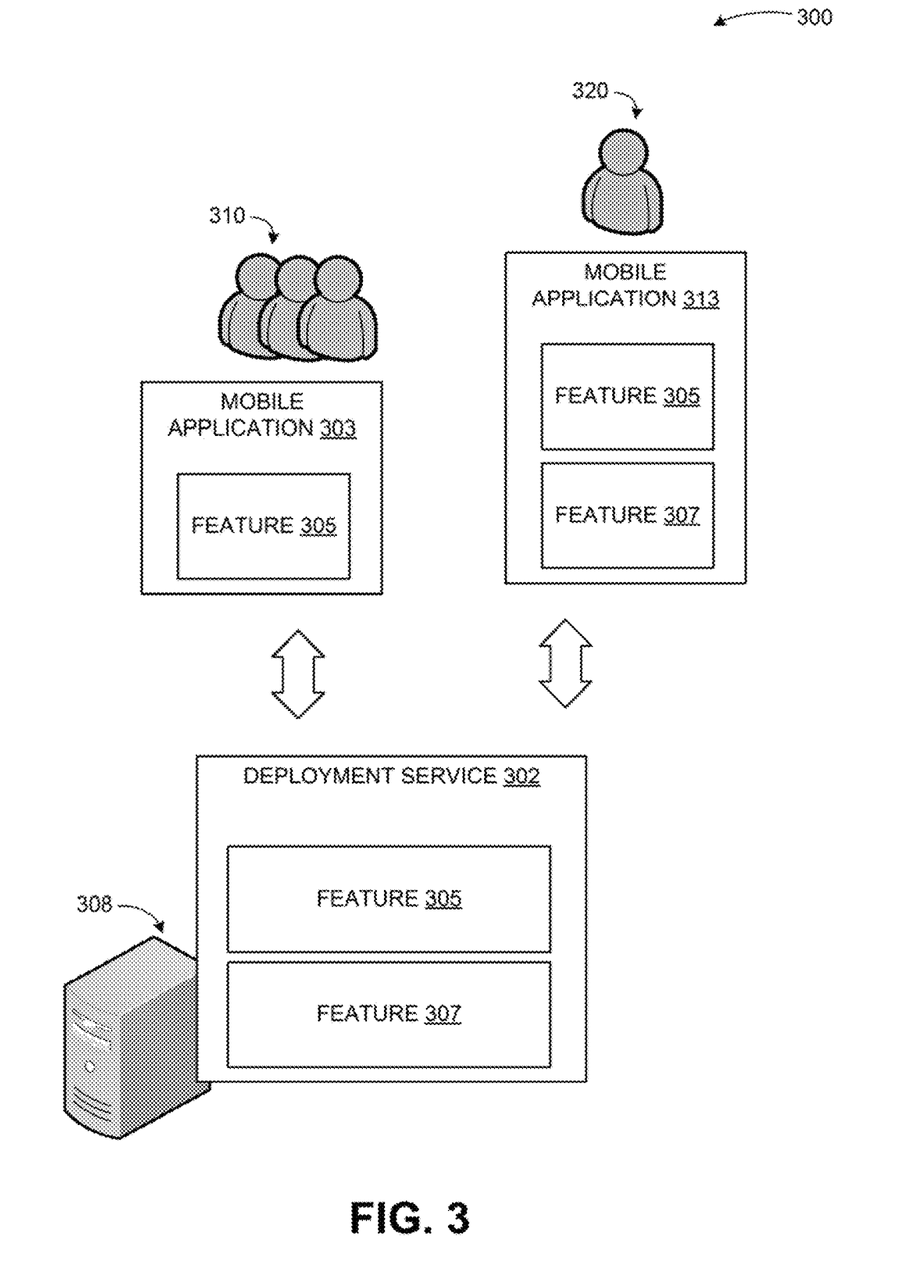
FIG. 3 is a display diagram illustrating another example of a scheme to provide controlled deployment of an application feature, according to embodiments.

FIG. 3 is a display diagram illustrating another example of a scheme to provide controlled deployment of an application feature, according to embodiments.

In a diagram 300, a deployment service 302 (executed by a server 308) may receive a definition that includes a feature 305 and a group of tenants 310. The definition may be used to activate the feature 305 at a mobile application 303. At an initiation of the mobile application 303, a tenant identification transmitted from the mobile application 303 may be matched to the group of tenants and an instruction may be transmitted to the mobile application 303 to activate the feature 305.

The deployment service 302 may receive a new request to deploy a feature 307 from the developer. The request may include a definition of a new group of the tenants and the feature 307. The feature 307 may be a new feature of a mobile application 313 that the developer may wish test with the new group of the tenants. The feature 307 may be deployed to the mobile application 313 by the deployment service 302 in a deactivated state. Alternatively, the feature 307 may be deployed to the mobile application 313 using a third party deployment scheme.

The deployment service 302 may wait to receive a tenant identification of a tenant 320 to instruct the mobile application 313 to activate the feature 307. The tenant identification of the tenant 320 may be compared to the new group of the tenants. If the tenant identification is found within the new group of the tenants, the mobile application 313 may be instructed to activate the feature 307 for consumption by the tenant 320.

Figure 4:
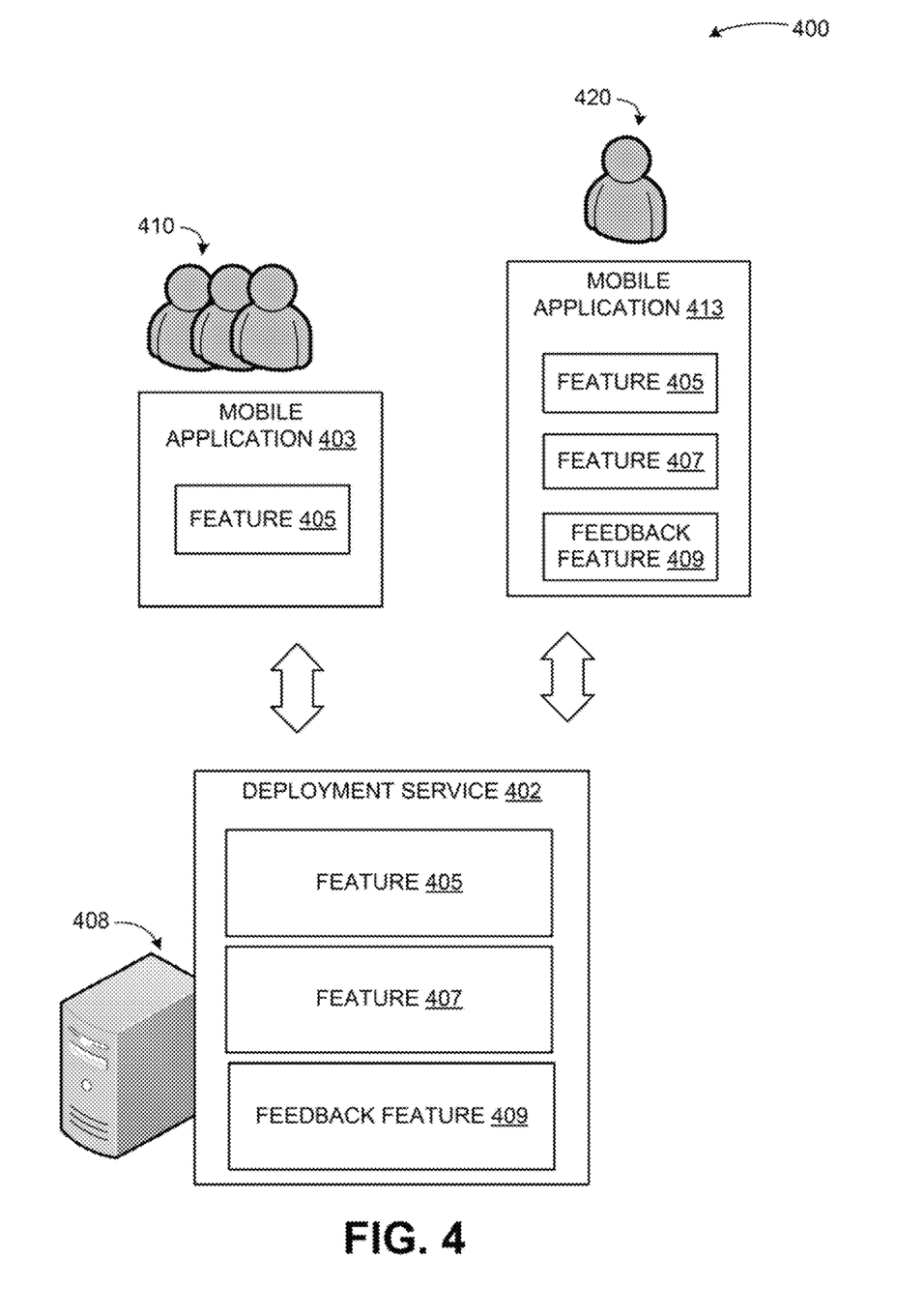
FIG. 4 is a display diagram illustrating activation of a feedback scheme to provide controlled deployment of an application feature, according to embodiments.

FIG. 4 is a display diagram illustrating activation of a feedback scheme to provide controlled deployment of an application feature, according to embodiments.

In a diagram 400, a deployment service 402 (executed by a server 408) may be used by a developer to control deployment of features (405, 407) and a feedback feature 409. The deployment service 402 may receive a definition of the feature 405 and a group of tenants 410 for deployment at a mobile application 403. The deployment service 402 may receive a tenant identification in response to an initiation of the mobile application 403. The tenant identification may be detected within the group of tenants 410. Next, the deployment service 402 may instruct the mobile application 403 to activate the feature 405 for consumption by a tenant associated with the tenant identification.

Alternatively, the deployment service 402 may receive a definition to deploy the features (405, 407) and a feedback feature 409 to other group of tenants, from the developer. A tenant identification of a tenant 420 may be compared to the other group of tenants to identify the tenant identification as within the other group of tenants. In response, the mobile application 413 may be instructed to activate the features (405, 407) and the feedback feature 409.

A positive feedback received from the mobile application 413 regarding the feature 407 may be used to instruct the mobile application 403 to activate the feature 407 for consumption by the group of tenants 410. Alternatively, the mobile application for the tenant base may be instructed to activate the feature 407 in response to the positive feedback from the mobile application 413 automatically or based on a request from the developer. The mobile application 413 may also be instructed to deactivate the feature 407 in response to a negative feedback received from the mobile application 413. The developer may be notified of the negative feedback to prompt the developer to address the issue causing the negative feedback.

As discussed above, the deployment service may be employed to perform operations to automate controlled deployment of an application feature. An increased user efficiency with the mobile application 103 may occur as a result of providing controlled deployment of an application feature through the deployment service 102. Additionally, feature management for group of tenants consuming the feature of the mobile application 103 by the deployment service 102 may reduce processor load, increase processing speed, conserve memory, and reduce network bandwidth usage.

Embodiments, as described herein, address a need that arises from a lack of efficiency to manage features of a mobile application 103 of a client device 104 managed by a deployment service 102. The actions/operations described herein are not a mere use of a computer, but address results that are a direct consequence of software used as a service offered to large numbers of users and applications.

The example scenarios and schemas in FIG. 1 through 4 are shown with specific components, data types, and configurations. Embodiments are not limited to systems according to these example configurations. Providing controlled deployment of an application feature may be implemented in configurations employing fewer or additional components in applications and user interfaces. Furthermore, the example schema and components shown in FIG. 1 through 4 and their subcomponents may be implemented in a similar manner with other values using the principles described herein.

Figure 5:
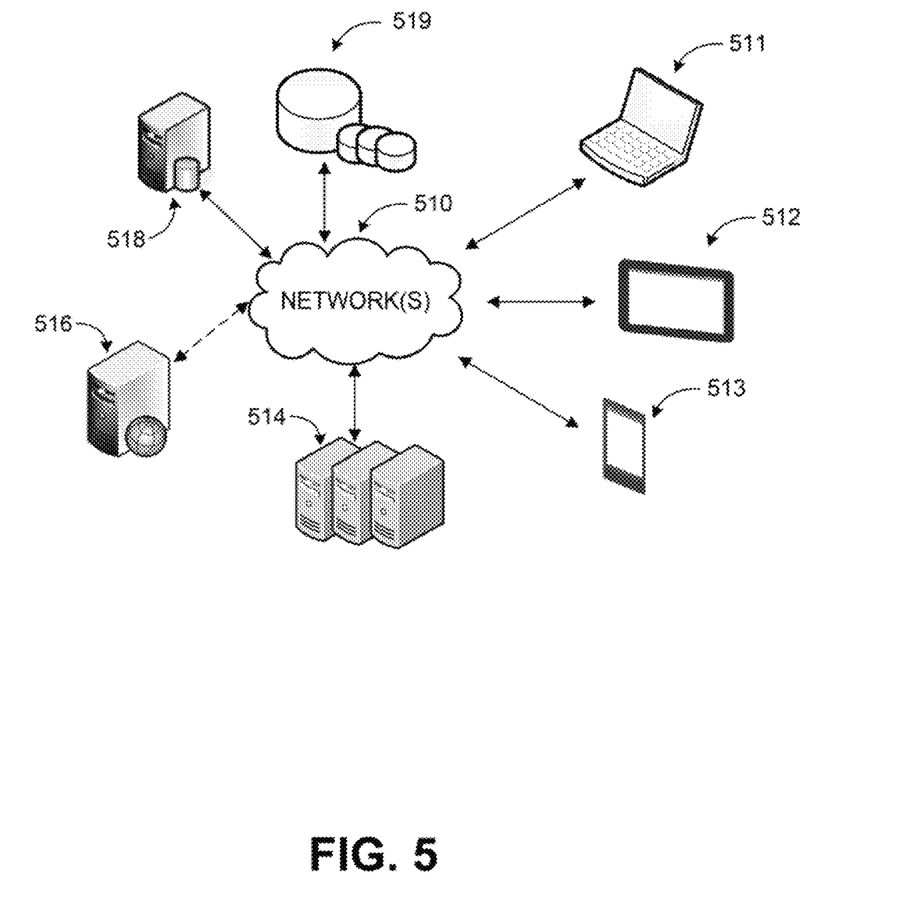
FIG. 5 is a simplified networked environment, where a system according to embodiments may be implemented.

FIG. 5 is an example networked environment, where embodiments may be implemented. A deployment service configured to provide controlled deployment of an application feature may be implemented via software executed over one or more servers 514 such as a hosted service. The platform may communicate with client applications on individual computing devices such as a smart phone 513, a mobile computer 512, or desktop computer 511 ('client devices') through network(s) 510.

Client applications executed on any of the client devices 511-513 may facilitate communications via application(s) executed by servers 514, or on individual server 516. A deployment service may receive a definition of a feature of a mobile application and a group of tenants of a mobile application from a developer and a tenant identification from the mobile application. Next, the tenant identification may be detected within the group of tenants. In response, an instruction may be transmitted to the mobile application associated with the tenant identification to activate the feature. The deployment service may store data associated with the feature in data store(s) 519 directly or through database server 518.

Network(s) 510 may comprise any topology of servers, clients, internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to provide controlled deployment of an application feature. Furthermore, the networked environments discussed in FIG. 5 are for illustration purposes only. Embodiments are not limited to the example applications, modules, or processes.

Figure 6:
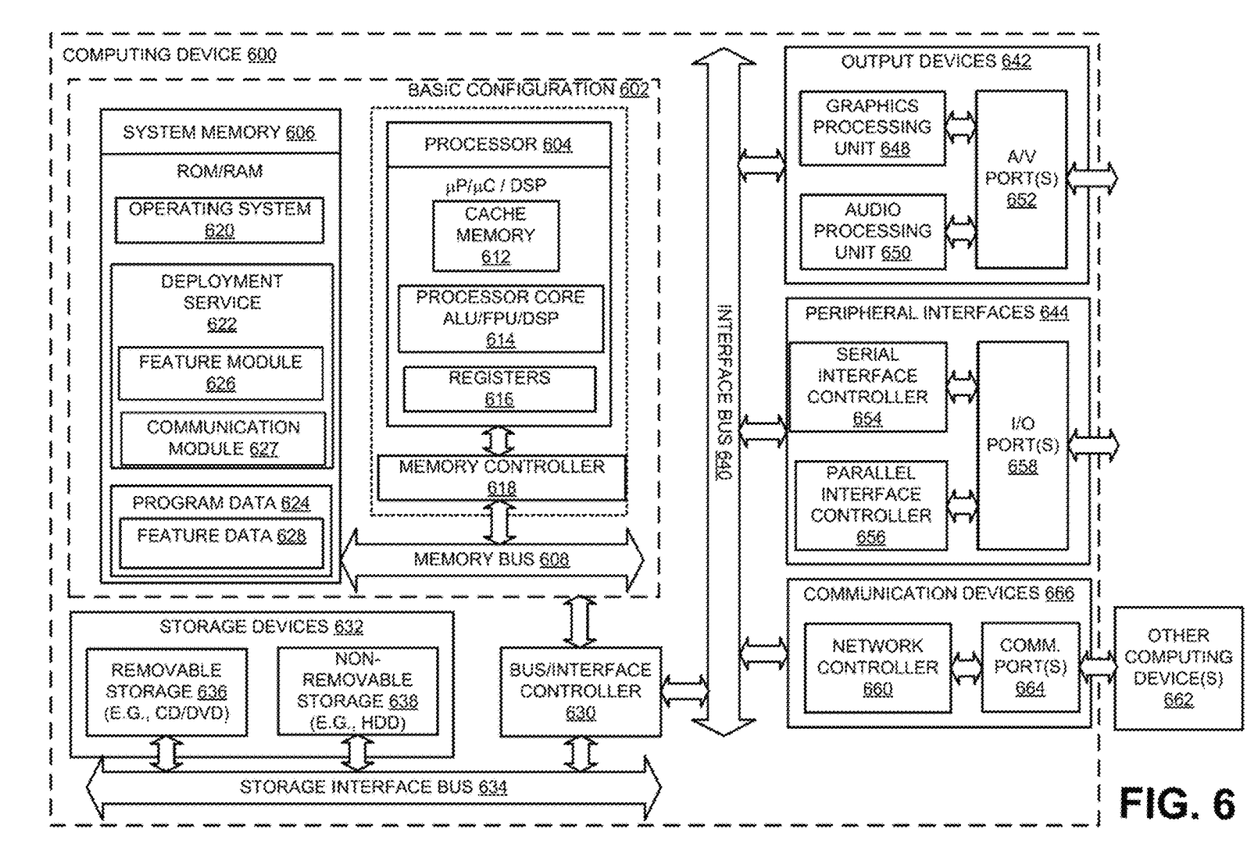
FIG. 6 is a block diagram of an example computing device, which may be used to provide controlled deployment of an application feature, according to embodiments.

FIG. 6 is a block diagram of an example computing device, which may be used to provide controlled deployment of an application feature, according to embodiments.

For example, computing device 600 may be used as a server, desktop computer, portable computer, smart phone, special purpose computer, or similar device. In an example, basic configuration 602, the computing device 600 may include one or more processors 604 and a system memory 606. A memory bus 608 may be used for communication between the processor 604 and the system memory 606. The basic configuration 602 may be illustrated in FIG. 6 by those components within the inner dashed line.

Depending on the desired configuration, the processor 604 may be of any type, including but not limited to a microprocessor (µP), a microcontroller (µC), a digital signal processor (DSP), or any combination thereof. The processor 604 may include one more levels of caching, such as a level cache memory 612, one or more processor cores 614, and registers 616. The example processor cores 614 may (each) include an arithmetic logic unit (ALU), a floating point unit (FPU), a digital signal processing core (DSP Core), or any combination thereof. An example memory controller 618 may also be used with the processor 604, or in some implementations, the memory controller 618 may be an internal part of the processor 604.

Depending on the desired configuration, the system memory 606 may be of any type including but not limited to volatile memory (such as RAM), non-volatile memory (such as ROM, flash memory, etc.), or any combination thereof. The system memory 606 may include an operating system 620, a deployment service 622, and a program data 624. The deployment service 622 may include components such as a feature module 626 and a communication module 627. The feature module 626 and the communication module 627 may execute the processes associated with the deployment service 622. The feature module 626 may receive a definition of a feature of a mobile application and a group of tenants of a mobile application from a developer, a tenant identification from the mobile application. Next, the tenant identification may be detected within the group of tenants. In response, the communication module 627 may transmit an instruction to the mobile application associated with the tenant identification to activate the feature.

Input to and output out of the deployment service 622 may be transmitted through a communication device associated with the computing device 600. An example of the communication device may include a networking device that may be communicatively coupled to the computing device 600. The networking device may provide wired and/or wireless communication. The program data 624 may also include, among other data, feature data 628, or the like, as described herein. The feature data 628 may include a tenant identification, a tenant, attribute, among others.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices may include magnetic disk devices, such as flexible disk drives and hard-disk drives (HDD), optical disk drives such as compact disk (CD) drives or digital versatile disk (DVD) drives, solid state drive (SSD), and tape drives, to name a few. Example computer storage media may include volatile and nonvolatile, removable, and non-removable media implemented in any method or technology for storage of information, such as computer-readable instructions, data structures, program modules, or other data.

The system memory 606, the removable storage devices 636 and the non-removable storage devices 638 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 666) to the basic configuration 602 via the bus interface controller 630. Some of the example output devices 642 include a graphics processing unit 648 and an audio processing unit 650, which may be configured to communicate to various external devices such as a display or speakers via one or more A/V ports 652. One or more example peripheral interfaces 644 may include a serial interface controller 654 or a parallel interface controller 656, which may be configured to communicate with external devices such as input devices (for example, keyboard, mouse, pen, voice input device, touch input device, etc.) or other peripheral devices (for example, printer, scanner, etc.) via one or more I/O ports 658. An example of the communication device(s) 666 includes a network controller 660, which may be arranged to facilitate communications with one or more other computing devices 662 over a network communication link via one or more communication ports 664. The one or more other computing devices 662 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a part of a general purpose or specialized server, mainframe, or similar computer, which includes any of the above functions. The computing device 600 may also be implemented as a personal computer including both laptop computer and non-laptop computer configurations.

Example embodiments may also include methods to provide controlled deployment of an application feature. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while either operations may be perforated by machines. These human operators need not be collocated with each other, but each can be only with a machine that performs a portion of the program. In other embodiments, the human interaction can be automated such as by pre-selected criteria that may be machine automated.

Figure 7:
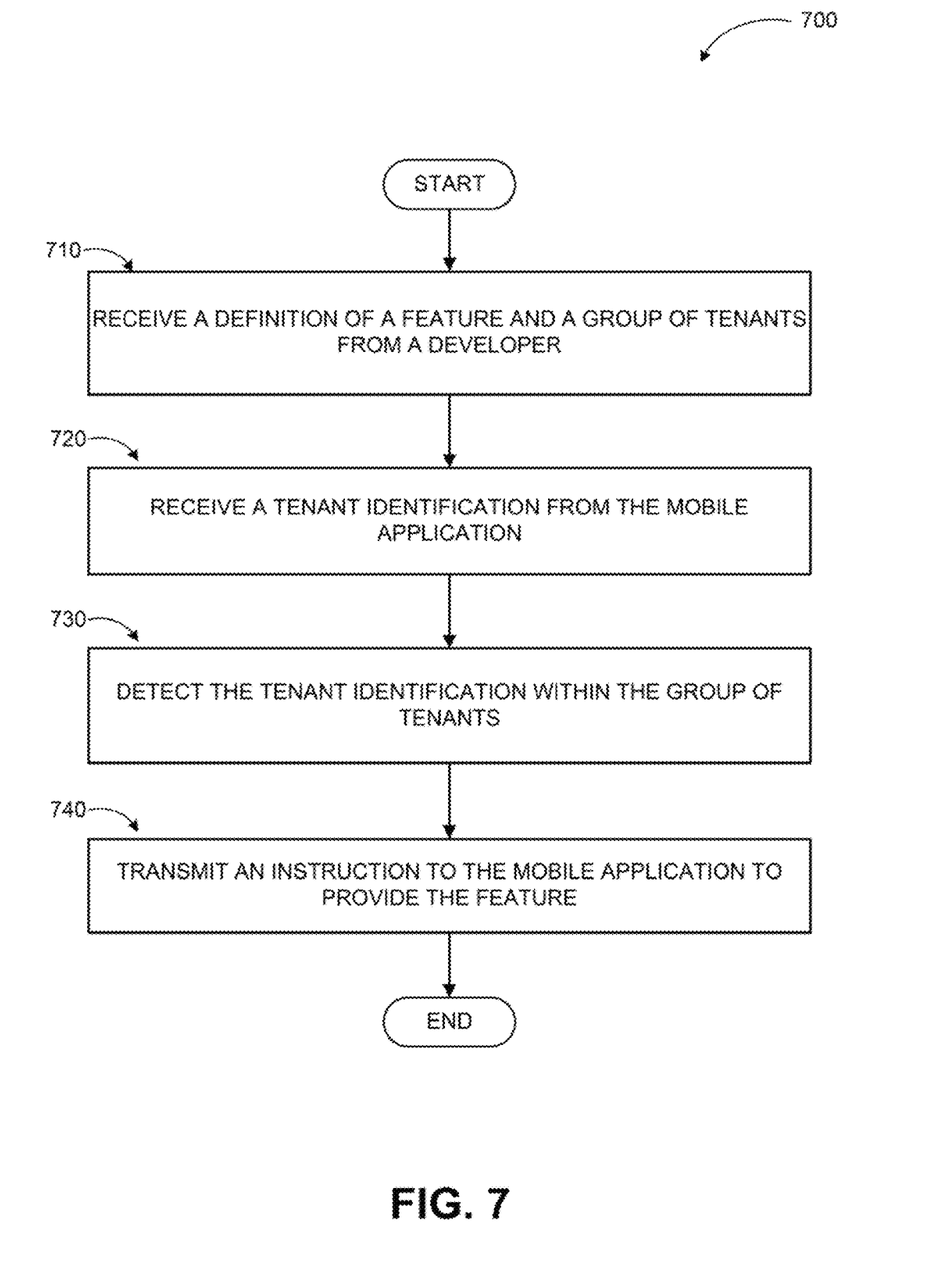
FIG. 7 is a logic flow diagram illustrating a process for providing controlled deployment of an application feature, according to embodiments.

FIG. 7 is a logic flow diagram illustrating a process for providing controlled deployment of an application feature, according to embodiments. Process 700 may be implemented on a computing device, such as the computing device 600 or another system.

Process 700 begins with operation 710, where the deployment service may receive a definition of a feature of a mobile application and a group of tenants of the mobile application from a developer. The definition may be used to allow the mobile application associated with the group of tenants to activate the feature. The feature may include an existing component, a new component, and/or a feedback component, among other components of the mobile application. Next, a tenant identification may be received from the mobile application at operation 720. The tenant identification may include a unique identifier associated with a tenant accessing the mobile application.

The tenant identification may be compared to the group of tenants to detect the tenant identification as within the group of tenants at operation 730. The group of tenants may include a subset of a tenant base classified to test the feature, and/or use the feature, among others. Next, an instruction may be transmitted to the mobile application associated with the tenant identification to activate the feature at operation 740.

The operations included in process 700 are for illustration purposes. Providing a controlled deployment of an application feature may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

In some examples, a server for providing controlled deployment of an application feature is described. The server includes a communication device, a memory configured to store instructions associated with a deployment service, and one or more processors coupled to the memory and the communication device. The one or more processors execute a deployment service in conjunction with the instructions stored in the memory. The deployment service includes a feature module and a communication module. The feature module is configured to receive a definition of a feature of a mobile application and a group of tenants of the mobile application from a developer, receive a tenant identification from the mobile application, and detect the tenant identification within the group of tenants. The communication module is configured to transmit, through the communication device, an instruction to the mobile application associated with the tenant identification to activate the feature.

In other examples, the tenant identification is detected within the group of tenants in response to a request from the developer to activate the feature within the mobile application associated with the group of tenants. The feature module is further configured to receive a request from the developer to activate the feature within the mobile application associated with a percentage of the group of tenants and query an availability of an allocation within the percentage of the group of tenants. The feature module is further configured to detect the availability of the allocation within the percentage of the group of tenants and prompt the communication module to transmit the instruction to the mobile application associated with the tenant identification to activate the feature. The feature module is further configured to detect an unavailability of the allocation within the percentage of the group of tenants and prompt the communication module to transmit another instruction to the mobile application associated with the tenant identification to not activate the feature.

In further examples, the feature module is further configured to identify a tenant attribute associated with the tenant identification, compare the tenant attribute with a group attribute of the group of tenants, and search for a match between the tenant attribute and the group attribute to classify the tenant identification as within the group of tenants. The feature module is further configured to defect a tenant location associated with the tenant identification as the tenant attribute, identify the tenant location as encompassed by a geographic location of the group of tenants, where the geographic location is detected as the group attribute, and affirm the match between the tenant attribute and the group attribute to classify the tenant identification as within the group of tenants.

In other examples, the feature module is further configured to detect a tenant location associated with the tenant identification as the tenant attribute, identify the tenant location as outside a geographic location of the group of tenants, where the geographic location is detected as the group attribute, identify a mismatch between the tenant attribute and the group attribute to classify the tenant identification as within the group of tenants, and prompt the communication module to transmit another instruction to the mobile application associated with the tenant identification to not activate the feature. The feature module is further configured to detect a tenant role associated with the tenant identification as the tenant attribute, identify the tenant role as encompassed by a group role of the group of tenants, where the group role is detected as the group attribute, and affirm the match between the tenant attribute and the group attribute to classify the tenant identification as within the group of tenants.

In further examples, the feature module is further configured to detect a tenant role associated with the tenant identification as the tenant attribute, identify tenant role as outside a group role of the group of tenants, where the group role is detected as the group attribute, identify a mismatch between the tenant attribute and the group attribute to classify the tenant identification as within the group of tenants, and prompt the communication module to transmit another instruction to the mobile application associated with the tenant identification to not activate the feature. The tenant identification includes a unique identifier associated with a tenant of the mobile application and a tenant attribute that is matched to a group attribute of the group of tenants for a classification of the tenant identification as within the group of tenants.

In some examples, a method executed on a computing device for controlled deployment of an application feature is described. The method includes receiving a definition of a feature of a mobile application and a group of tenants from a developer, receiving a request from the developer to activate the feature within the mobile application associated with the group of tenants, receiving a tenant identification from the mobile application, detecting the tenant identification within the group of tenants, and transmitting an instruction to the mobile application associated with the tenant identification to activate the feature.

In other examples, the method further includes receiving other definition of other feature and other group of tenants from the developer, receiving other request from the developer to activate the other feature within the mobile application associated with the other group of tenants, and receiving other tenant identification from the mobile application. The method further includes detecting the other tenant identification within the other group of tenants and transmitting other instruction to the mobile application associated with the other tenant identification to activate the other feature.

In further examples, the method further includes receiving other request from the developer to deactivate the feature within the mobile application associated with the group of tenants and transmitting other instruction to the mobile application associated with the tenant identification to deactivate the feature. The method further includes receiving a feedback definition of a feedback feature for the group of tenants from the developer, receiving a feedback request from the developer to activate the feedback feature within the mobile application associated with the group of the tenants, and transmitting other instruction to the mobile application associated with the tenant identification to activate the feedback feature. The method further includes receiving feedback from the mobile application associated with the tenant identification, analyzing a feedback to identify a negative impression associated with the feature, and transmitting a new instruction to the mobile application associated with the tenant identification to deactivate the feature and the feedback feature.

In some examples a computer-readable memory device with instructions stored thereon for providing controlled deployment of an application feature is described. The instructions include actions that are similar to the actions of the method.

In some examples, a means for providing controlled deployment of an application feature is described. The means for providing controlled deployment of an application feature includes a means for receiving a definition of a feature of a mobile application and a group of tenants of the mobile application from a developer, a means for receiving a tenant identification from the mobile application, a means for detecting the tenant identification within the group of tenants, and a means for transmitting an instruction to the mobile application associated with the tenant identification to activate the feature.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A server for providing controlled deployment of an application feature, the server comprising:
   a communication device;
   a memory configured to store instructions associated with a cloud based deployment service;
   one or more processors coupled to the memory and the communication device, wherein the one or more processors executing the cloud based deployment service in conjunction with the instructions stored within the memory, are configured to:
      receive a definition of a feature of an application from the cloud based deployment service;
      select a group of tenants with in a tenant base associated with the application;
   transmit an instruction to the application for the selected group of tenants to activate the feature for evaluation of the feature prior to deployment;
      receive feedback associated with the feature from the group of tenants;
      analyze the feedback to identify a positive impression associated with the feature; and
      in response to the identification of the positive impression associated with the feature, transmit a new instruction, to the application associated with the tenant base encompassing the group of tenants to activate the feature.

2. The server of claim 1, wherein the group of tenants is selected to include a subset of the tenant base classified to test the feature or use the feature.

3. The server of claim 1, wherein the feature includes one of: an existing component, a new component, or a feedback component.

4. The server of claim 1, wherein the one or more processors are further configured to:
   identify a tenant attribute by the deployment service to select a tenant within the tenant base.

5. The server of claim 4, wherein the tenant attribute includes one of: a tenant location or a tenant role.

6. The server of claim 5, wherein the one or more processors are further configured to:
   identify the tenant location as encompassed by a geographic location of the group of tenants, wherein the geographic location is detected as a group attribute;
   affirm a match between the tenant attribute and the group attribute to select the tenant within the tenant base; and
   transmit an instruction to the application to activate the feature for the selected tenant.

7. The server of claim 5, wherein the one or more processors are further configured to:
   identify the tenant location as outside a geographic location of the group of tenants, wherein the geographic location is detected as the group attribute;
   identify a mismatch between the tenant attribute and the group attribute; and
   transmit another instruction to the application to not activate the feature for the selected tenant.

8. The server of claim 1, wherein the one or more processors are further configured to:
   analyze the feedback to identify a negative impression associated with the feature; and
   in response to the identification of the negative impression associated with the feature, transmit another instruction to the application associated the group of tenants to deactivate the feature.

9. The server of claim 1, wherein analyze the feedback to further identify one or more of faults or errors in the feature.

10. The server of claim 1, wherein the group of tenants is selected by determining an availability of an allocation within a percentage of the group of tenants.

11. The server of claim 10, wherein in response to detect the availability of the allocation within the percentage of the group of tenants, transmit an instruction to the application to activate the feature.

12. A method executed on a computing device for controlled deployment of an application feature, the method comprising:
   receiving a definition of a feature of an application from a cloud based deployment service;
   selecting a group of tenants with in a tenant base associated with the deployed application;
   transmitting an instruction to the application for the selected group of tenants to actuate the feature for evaluation of the feature prior to deployment;
   receiving feedback associated with the feature from the group of tenants;
   analyzing the feedback to identify a positive impression associated with the feature;
   in response to the identification of the positive impression associated with the feature, transmitting a new instruction to the application associated with a tenant base encompassing the group of tenants to activate the feature;
   receiving another feedback associated with the feature from the group of tenants;
   analyzing the other feedback to identify a negative impression associated with the feature; and
   in response to the identification of the negative impression associated with the feature, transmitting another instruction to the application associated the group of tenants to deactivate the feature.

13. The method of claim 12, further comprising:
   identifying a tenant attribute by the deployment service to select a tenant within the tenant base to form the group of tenants, wherein the tenant attribute includes one of: a tenant location or a tenant role.

14. The method of claim 13, further comprising:
   identifying the tenant role as encompassed by a group role of the group of tenants, wherein the group role is detected as the group attribute;
   affirming a match between the tenant attribute and the group attribute to select the tenant within the tenant base; and
   transmitting an instruction to the application to activate the feature for the selected tenant.

15. The method of claim 13, further comprising:
   identifying the tenant role as outside a group role of the group of tenants, wherein the group role is detected as the group attribute;
   identifying a mismatch between the tenant attribute and the group attribute; and
   transmitting another instruction to the application to not activate the feature for the selected tenant.

16. The method of claim 12, wherein the group of tenants is selected to include a subset of the tenant base classified to test the feature or use the feature.

17. The method of claim 12, wherein the group of tenants is analyzed to determine an availability of an allocation within a percentage of the group of tenants.

18. A computer-readable computer storage media device with instructions stored thereon for providing controlled deployment of an application feature, the instructions comprising:
   receiving a definition of a feature of a deployed application from a cloud based deployment service;
   selecting a group of tenants within a tenant base associated with the application;
   transmitting an instruction to the application for the selected group of tenants to activate the feature for evaluation of the feature prior to deployment;
   receiving feedback associated with the feature from the group of tenants;
   analyzing the feedback to identify a positive impression associated with the feature; and
   in response to the identification of the positive impression associated with the feature,
   transmitting a new instruction to the application associated with a tenant base encompassing the group of tenants to activate the feature.

19. The computer-readable computer storage media device of claim 18, wherein the instructions further comprise:
   identifying a tenant attribute by a deployment service to select a tenant within the tenant base to form the group of tenants, wherein the tenant attribute includes one of: a tenant location or a tenant role;
   identifying the tenant location as encompassed by a geographic location of the group of tenants, wherein the geographic location is detected as a group attribute; and
   affirming a match between the tenant attribute and the group attribute to select the tenant within the tenant base.

20. The computer-readable computer storage media device of claim 19, wherein the instructions further comprise:
   identifying the tenant role as encompassed by a group role of the group of tenants, wherein the group role is detected as the group attribute; and
   affirming a match between the tenant attribute and the group attribute to select the tenant within the tenant base.

* * * * *